(12) United States Patent
Steeb

(10) Patent No.: US 8,579,161 B2
(45) Date of Patent: Nov. 12, 2013

(54) LOW PROFILE BATTER DISPENSER

(76) Inventor: William R. Steeb, Kansas City, MO (US)

(*) Notice: Subject to any disclaimer, the term of this patent is extended or adjusted under 35 U.S.C. 154(b) by 1216 days.

(21) Appl. No.: 12/454,290

(22) Filed: May 15, 2009

(65) Prior Publication Data

US 2010/0291277 A1 Nov. 18, 2010

(51) Int. Cl.
*B67D 7/80* (2010.01)

(52) U.S. Cl.
USPC .......................... 222/146.6; 62/372

(58) Field of Classification Search
USPC ............. 222/146.6, 181.1, 181.3, 146.1; 220/592.1; 62/371, 372, 389–400, 62/440–446
See application file for complete search history.

(56) References Cited

U.S. PATENT DOCUMENTS

| | | | | |
|---|---|---|---|---|
| 5,377,878 | A * | 1/1995 | Rainey et al. | 222/146.6 |
| 5,444,992 | A * | 8/1995 | Bell | 62/372 |
| 5,469,708 | A * | 11/1995 | Harrison et al. | 62/3.64 |
| 6,334,329 | B1 * | 1/2002 | Weller | 62/371 |
| 6,913,167 | B2 * | 7/2005 | Phelps et al. | 222/152 |
| 8,313,007 | B2 * | 11/2012 | Kpabar | 222/108 |
| 2009/0020559 | A1 * | 1/2009 | Sanfilippo et al. | 222/107 |

OTHER PUBLICATIONS

Complete Training Video Version 1.0, date unknown, New Carbon Company, Retrieved Apr. 29, 2009 from http://www.newcarbon.com/browseMovies.php?cPath=24&sid=87ab5b4587f38a45e0377837bdfb7384&menu=1.

* cited by examiner

*Primary Examiner* — Lien Ngo
(74) *Attorney, Agent, or Firm* — John C. McMahon

(57) ABSTRACT

A low profile batter dispenser, for the housing of batter on a counter top for an extended period of time while cooling the batter to resist bacterial growth therein. The batter dispenser includes a housing, a batter container, and an ice pack assembly for holding an ice pack on the bottom of and in contact with the batter container.

15 Claims, 3 Drawing Sheets

LOW PROFILE BATTER DISPENSER

BACKGROUND OF THE INVENTION

The present invention relates to a dispenser for thick batters, such as pancake and waffle batter.

It is popular to offer pancakes and/or waffles at many types of restaurants, buffets, catered events and the like. Often the batter for the pancakes and waffles is mixed when the facility opens or at the beginning of an event and allowed to sit so that it is available for use during the period when the pancakes and waffles are offered.

Because the batter is relatively quite thick, it does not flow well and the persons using the batter are left to rely on inconvenient and cumbersome methods of dispensing the batter such as pouring from a large vessel or dipping. Such dispensing methods are often also unsanitary as the user's fingers tend to engage the rim of the vessel and utensils may be laid about to pick up bacteria and debris from counter tops and the like.

As with most equipment used by the food service industry, it is also desirable that the dispenser be easily cleaned without the expenditure of a substantial amount of expensive manual labor.

SUMMARY OF THE INVENTION

In a first embodiment, the present invention provides an improved waffle and pancake batter dispenser for mixing, storing and dispensing a thick batter. The dispenser includes a housing configured and arranged to receive a batter container having an interior and a sloped floor. The improvement includes an ice pack assembly located in the housing. The ice pack assembly includes a sloped ice pack bed and at least two adjustment pins, wherein the sloped ice back bed is configured and arranged for support of an ice pack at an angle of incline substantially equal to an angle of incline of the floor of the batter container, and wherein the adjustment pins are configured and arranged to releasably engage adjustment slots located within the housing. When an ice pack is placed on the ice pack bed and the batter container is received into the housing, the ice pack firmly contacts an exterior surface of the floor of the batter container, such that during use the ice pack cools the batter container.

In a further embodiment of the first embodiment, the housing is a low profile housing.

In a further embodiment of the first embodiment, the adjustment slots include a front to rear orientation, such that engaged adjustment pins are forwardly and rearwardly mobile with respect to a front of the housing.

In a further embodiment of the first embodiment, the ice pack includes a plurality of thicknesses.

In a further embodiment of the first embodiment, the interior of the batter container includes a side inner surface and a plurality of water level lines located on the side inner surface, wherein the water level lines are associated with amounts of water required to make different pre-measured amounts of batter, such that a user can measure an amount of water into the dispenser interior, for making an associated pre-measured amount of batter within the dispenser interior.

In a further embodiment of the first embodiment, the batter dispenser includes a non-drip valve.

In a further embodiment, the non-drip valve includes a plastic tube having a barrel in fluid flow communication with an interior of the batter container, and a silicon sleeve biases against the barrel of the plastic tube.

In a further embodiment, the non-drip valve includes an open position and a closed position, wherein when the valve is in the open position the barrel of the plastic tube is in fluid flow communication with the interior of the batter container, and when the valve is in the closed position the silicon sleeve is biased against the barrel of the plastic tube and the barrel of the plastic tube is not in fluid flow communication with the interior of the batter container.

In a second embodiment, the present invention provides a dispenser for preparing and dispensing waffle and pancake batter, which includes: a housing adapted to be placed on a surface, wherein the housing has an interior; an ice pack assembly slidably received within the housing interior, and including a sloped ice pack bed and at least two adjustment pins, wherein the sloped ice pack bed is configured and arranged to support an ice pack; and a batter container removably received within the housing, and including a front wall, a back wall, two side walls, and a floor, all of which define an interior of the batter container, and a non-drip valve located at the bottom of the front wall, wherein the non-drip valve has an open position and a closed position and is generally biased in a closed position and wherein the floor slopes downwardly from the back wall to the front wall, such that the interior of the batter container is in fluid flow communication with an interior of the valve when the valve is in the open position.

In a further embodiment of the second embodiment, the housing includes a floor pan having at least two adjustment slots for slidably receiving the at least two adjustment pins, such that during use, an ice pack supported by the ice pack bed is pressed against the bottom of the batter container, whereby batter located in the interior of the batter container is cooled.

In a further embodiment of the second embodiment, a slope of the ice pack bed is substantially equal to a slope of the floor of the batter container.

In a further embodiment of the second embodiment, the valve includes a tube having a barrel, an orifice between the interior of the batter container and the barrel, a silicone sleeve biased against the barrel such that the orifice is closed, and a manual actuator for moving the valve from a closed position to an open position, wherein the barrel and the interior of the batter container are in fluid flow communication through the orifice when the valve is in the open position.

In a further embodiment of the second embodiment, an interior surface of at least one of the front, back and side walls includes a plurality of water level lines, for indicating an amount of water to be added to the batter container, wherein the amount of water at each water level line is associated with a fixed amount of mixed batter.

In a further embodiment of the second embodiment, the batter dispenser is sized to be received by a conventional home dish washing machine in an inverted orientation.

In a third embodiment, the present invention provides a method of making and dispensing waffle and pancake batter, including the steps of pouring an amount of water into a batter container such that the surface of the water aligns with a water level line located within the batter container; adding a pre-measured amount of pancake mix to the batter container and mixing the mix with the amount of water, such that the mixed batter is formed in a selected amount; placing an ice pack on an ice pack assembly located within a dispenser housing; and placing the batter container into the housing, such that a bottom of the container firmly and directly contacts the ice pack.

In a further embodiment of the third embodiment, the method includes closing the housing.

In a further embodiment of the third embodiment, the method includes dispensing an amount of the mixed batter through a valve.

In a further embodiment of the third embodiment, placing an ice pack on an ice pack assembly includes slidably adjusting a position of the ice pack assembly with respect to the housing.

In a further embodiment of the third embodiment, the method includes inverting the batter container in a dishwasher and cleaning the batter container.

In a further embodiment of the third embodiment, the method includes removing the batter container from the dispenser housing and storing the batter container in a refrigerator.

Advantages of the Invention

Therefore, advantages of various embodiments of the invention are: a thick batter dispenser that allows the user to easily and quickly dispense a desired amount of batter without significant contamination; a dispenser that is a low-profile device and thus takes up less space on a counter top; a dispenser that includes a cooling pack assembly that cools the bottom of the batter container in the dispenser such that bacterial growth within the batter is substantially prevented during use of the device, even as the batter level drops in the batter container; to provide a dispenser that easily fits into a dishwasher when inverted; and a dispenser that is easy to use, inexpensive to produce and especially suited for the intended usage thereof.

Other advantages and certain objects of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a cross sectional view of the batter dispenser, taken along line 3-3 of FIG. 1.

FIG. 5 is a fragmentary and enlarged view of a valve of the batter dispenser, illustrating movement of a manual actuator thereof in solid and phantom lines.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
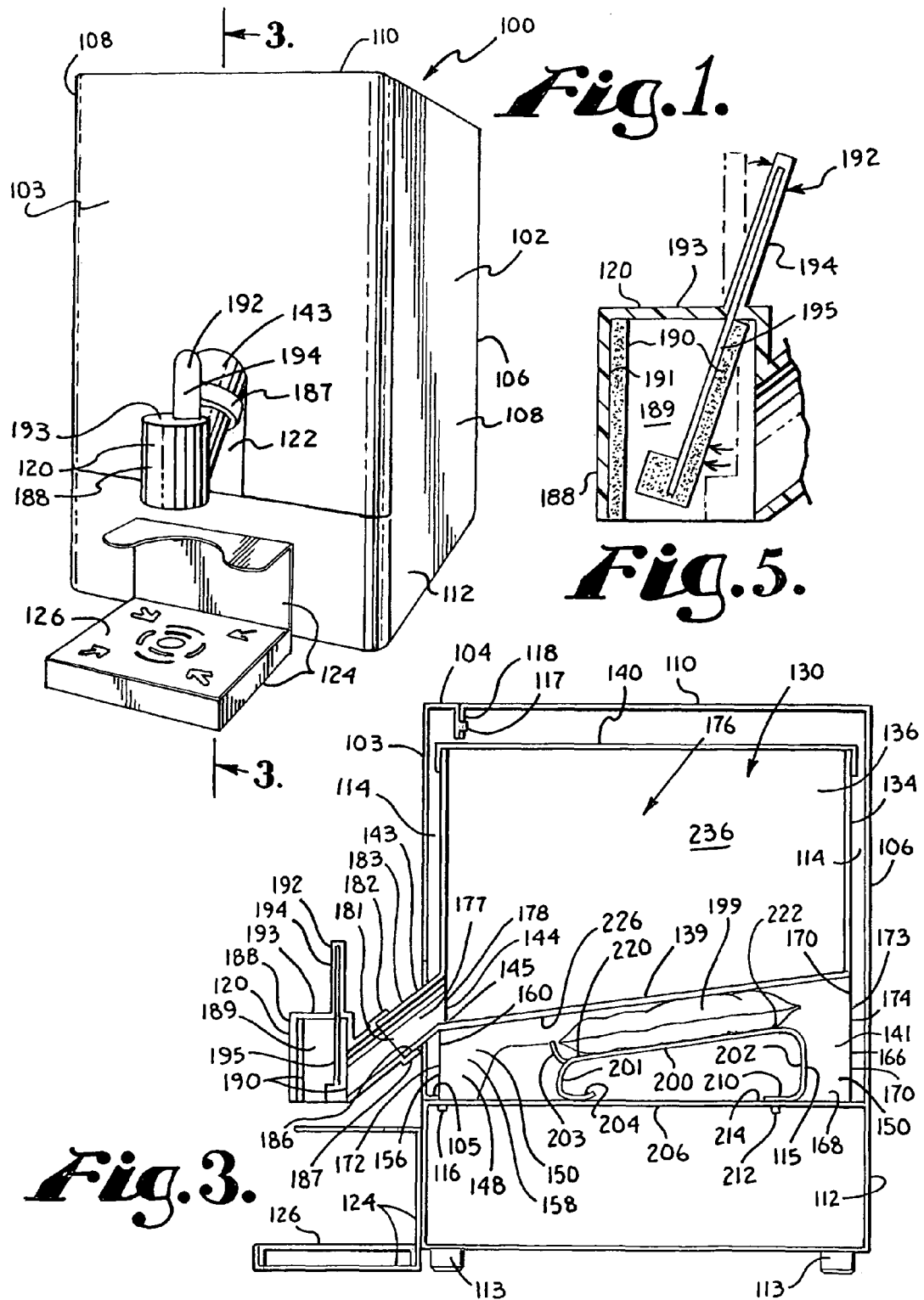
FIG. 1 is a perspective view of the batter dispenser of an illustrated embodiment of the present invention.
Figure 2:
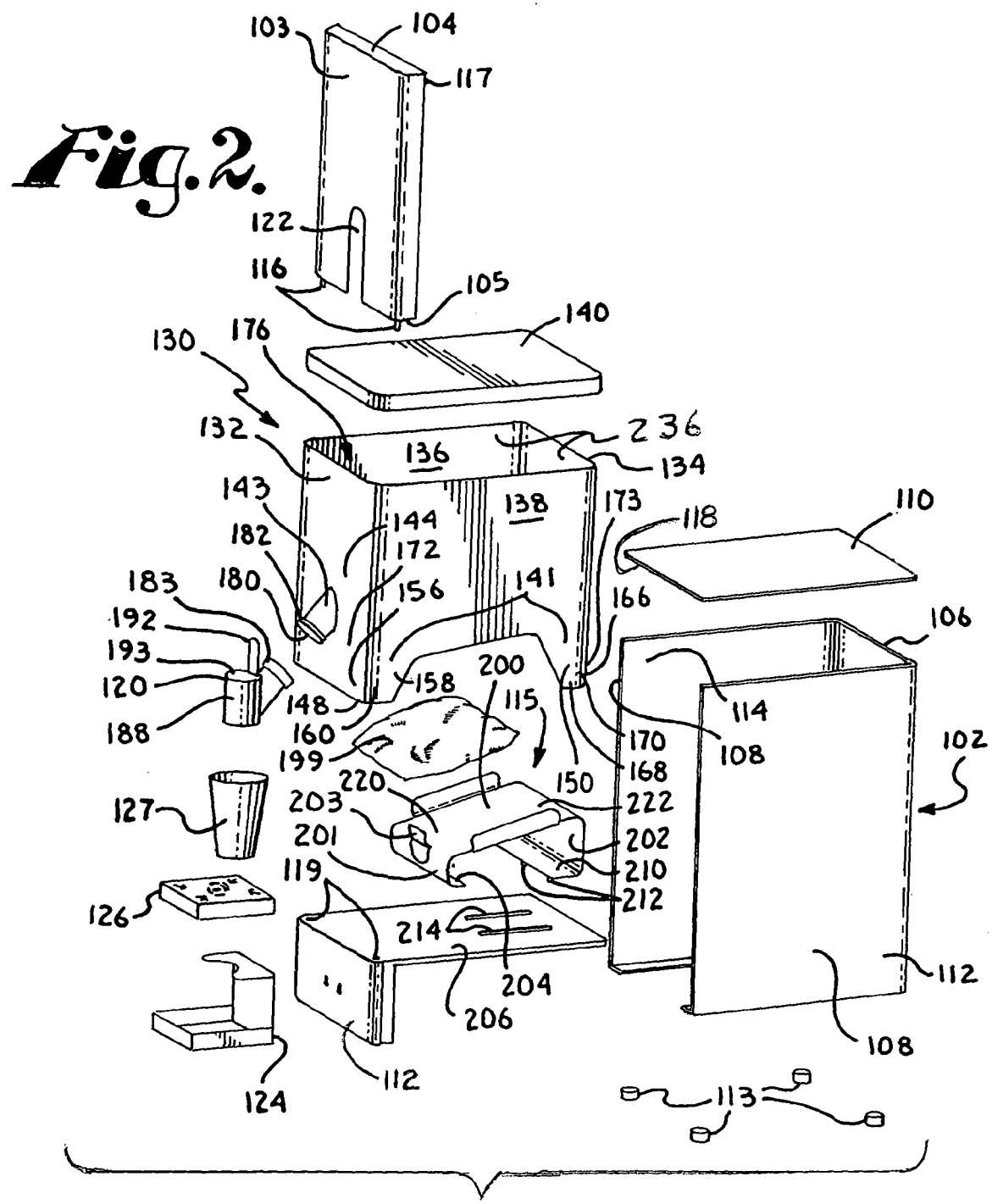
FIG. 2 is an exploded perspective view of the batter dispenser.

Referring to FIGS. 1 to 5, a low profile waffle and pancake batter dispenser is provided for dispensing a thick batter that is generally indicated by the reference numeral 100. The batter dispenser 100 is configured and arranged to be placed on a counter or table top, such as near a cooking surface or a waffle maker, for convenient dispensing of the batter. The dispenser 100 includes a housing 102 formed of a plurality of panels, including a removable front panel 103 with top and bottom lips 104 and 105, a back panel 106, two side panels 108, and a top panel 110. The side and back panels 106 and 108 can be formed of a single sheet of metal (e.g., stainless steel) or food grade plastic, such as is shown in FIG. 2, or they can be formed of individual panels that are welded, adhered, stapled, or otherwise non-removably attached together to form the depicted U-shaped structure of the back and side panels 106 and 108. The top panel 110 can also be non-removably attached onto the back and side panels 106 and 108 using welding, adhesive, staples, pins and the like. The housing 102 includes a base 112 with four non-slip, elastic feet 113 attached thereto. The feet 113 prevent the device 100 from slipping when placed on a counter surface. The front panel 103 is configured to be removed, such as by lifting it from the housing 102, thereby providing access to a housing interior 114. For example, in the illustrated embodiments, the front panel 103 is removably attached to the housing 102 by releasably engaging connection pins 116, which extend downwardly from the lower lip 105 of the front panel 103, with pin receptacles 119 (e.g., holes, orifices) located in the base 112, and releasably engaging detents 117, which extend inwardly from the upper lip 104 of the front panel 103, with the front lip 118 of the top panel 110. Other connection devices known in the art, such as hooks, locks, and screws can also be used.

A valve 120 (e.g., spout or nozzle), for dispensing the batter, extends outwardly from the housing 102 via an orifice 122 (e.g., opening, aperture) located in the bottom (e.g., lower portion) of the front panel 103. For example, the orifice 122 is a U-shaped cut-out or arch in the lower one-third to one-half of the front panel 103. The orifice 122 is generally configured and arranged such that the front panel 103 does not contact the valve 120 when the housing 102 is closed (e.g., the front panel 103 is joined the remainder of the housing 102 via engaging the connection pins 116 and the pin receptacles 119, and engaging the detents 117 with receivers in the front lip 118 of the top panel).

A drip tray 124, which is a shallow box, is placed beneath the valve 120 (e.g., adjacent to the base 112, for catching batter that may drip during and/or after the batter is dispensed. A drip tray cover 126 is inserted into the drip tray 124, to support a cup 127 (or a similar container) placed under the valve 120. When a cup 127 is placed under the valve 120 (e.g., on the drip tray cover 126), batter, such as an amount of batter sufficient for making a pancake or waffle, can be dispensed from the valve 120 and into the cup 127.

Figure 4:
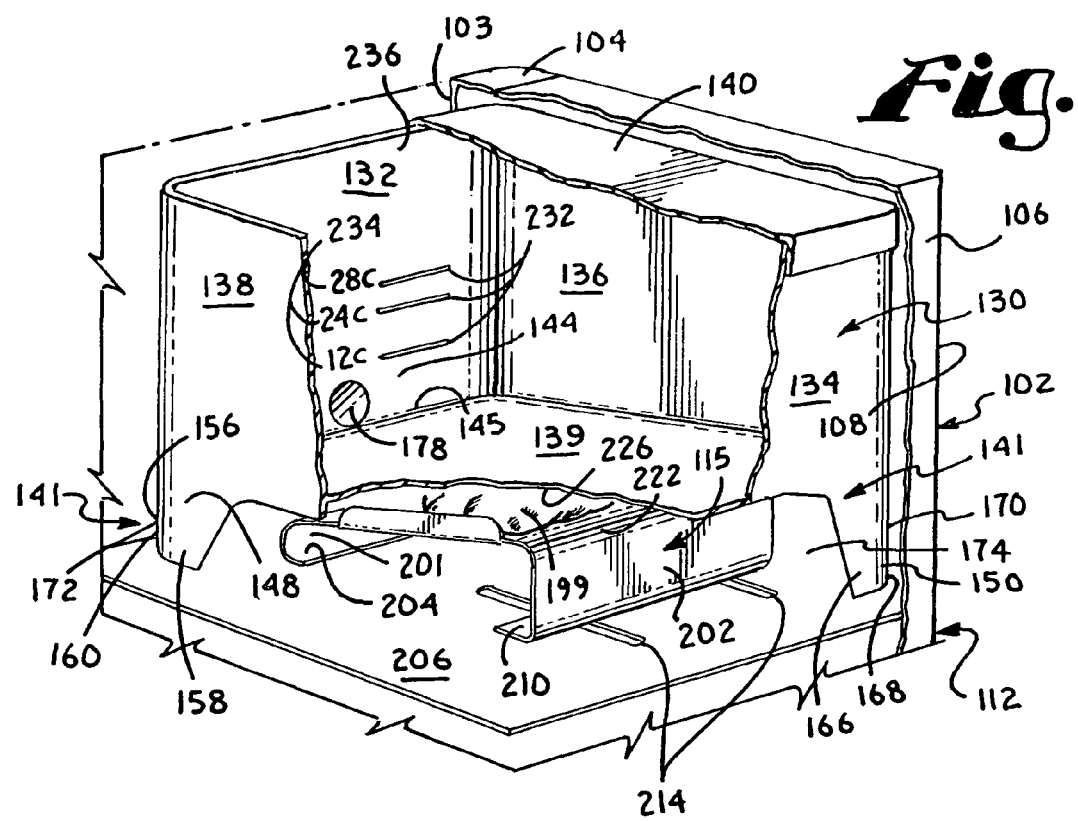
FIG. 4 is a fragmentary rear perspective view of the batter dispenser, with portions removed to show detail thereof.

Referring now to FIGS. 2-4, the housing 102 includes an interior 114, which is defined by the panels 103, 106, 108, 110 of the housing 102, and an ice pack assembly 115 located therein. The interior 114 of the housing 102 is configured and arranged to removably receive a batter container 130, such that the batter container 130 slides over the ice pack assembly 115 and slidably abuts against or is in close proximity to the side panels 106 and 108. The batter container 130 includes a front wall 132 (e.g., front side), a back wall 134 (e.g., back side), two side walls 136, 138, and a floor 139 (e.g., bottom). The batter container 130, which is preferably made of food-grade plastic, includes a cover 140, for covering (e.g., closing) the remainder of the batter container 130, for preventing dust or other foreign matter from falling into the batter container 130, especially when it contains a batter. The batter container 130 is supported by a base 141 that extends generally downward from the front, back and side walls 132, 134, 136, 138, such that the floor 139 is supported above the ice pack assembly 115, when the batter container 130 is received into the interior 114 of the housing 102. A spout 143, for connection of the batter container 130 to the valve 120, extends generally out and downward (e.g., through orifice 122 of the front panel 103) from the lower portion 144 (e.g., about the lower one-third to one-fourth) of the front wall 132. It is foreseen that in some embodiments, the batter container 130 does not include a spout 143, for connection of a valve 120 thereby. Rather, the spout 143 is included in the valve 120, which is connected to a screw-threaded orifice 178 located in the front wall 132 of the batter container 130. The lower side of the spout 143 preferably mates with the lowermost portion of the floor 139 at a front end of the floor 139.

In preferred embodiments, the batter container 130 fits snugly within the housing interior 114. When the batter container 130 is received into the interior 114 of the housing 102 and the front panel 103 is engaged, the valve 120 generally extends from the batter container 130 (e.g., via spout 143), through orifice 122, such that the valve 120 can be manipulated (e.g., operated) by a user, for dispensing of batter, when the front panel 103 is mounted on the remainder of the housing 102 (e.g., the housing is closed).

The base 141 of the batter container 130 includes four (4) L-shaped legs (e.g., two front legs 148 and two rear legs 150) that extend generally downward from the walls (e.g., sides) 132, 134, 136 and 138 of the batter container 130. For example, each front leg 148 extends downwardly from a side portion 156 of the front wall 132 and a front portion 158 of each of the side walls 136 and 138, such that each of the two front legs 148 wraps around an intersection 160 (e.g., corner) of front and side walls 132, 136 and 138. Also, each back leg 150 extends downwardly from a side portion 166 of the back wall 134 and a back portion 168 of each of the side walls 136 and 138, such that each of the two back legs 150 wraps around the intersection 170 (e.g., corner) of back and side walls 134, 136 and 138. In the illustrated embodiment, the front legs 148 are integrally formed (e.g., the front 172 of the container base 141 extends all the way across the front of the batter container 130). However, it is foreseen that the front legs 148 can be separated (e.g., a cut-out portion there between). The back 173 of the container base 141 includes a cut out portion 174 that is configured and arranged to slide over an ice pack assembly 115 (e.g., having an ice pack 186 thereon) located within the housing 102, such as described below. Accordingly, placing the batter container 130 into the housing 102 is not hampered by the presence of the ice pack assembly 115 and, as noted below, cooperates with the ice pack assembly 115.

As described above, the batter container 130 includes a spout 143 that is configured and arranged to connect in fluid flow the interior 176 of the batter container 130 to the valve 120, such that batter within the batter container may selectively be dispensed through the valve 120. The spout 148 of the batter container 130 extends outward and downward (e.g., at an angle of incline; through orifice 122 of the front panel 103) from the lower portion 144 (e.g., about the lower onethird to one-fourth) of the front wall 132, such that batter can drain from the container interior 176, through the spout 143 and into the valve 120. For example, the spout 143 is located adjacent to the intersection 145 of the front wall 132 and the floor 139 of the batter container 130. As shown in FIGS. 2 and 3, the spout 143 is a hollow tube having a barrel 177 in fluid flow communication with the interior 176 of the batter container 130 via a first orifice 178. The valve 120 is in fluid flow communication with the spout 143 via a second orifice 180 located at a tip 181 of the spout 143. Screw threads 182, for removably connecting the valve 120 (described below), are located on the exterior 183 of the spout 143, adjacent to the tip 182.

FIG. 5 illustrates the valve 120 during operation. The valve 120 is a manual valve that is operated by a user to dispense batter from the device 100 of the illustrated embodiment. Preferably, the valve 120 is a non-drip valve, such that batter does not drip out of the valve 120 when it is in a closed position. The valve 120 is releasably connected to the spout 143 via internal screw threads 186 located within the valve's 120 connection socket 188. As is understood by one skilled in the art, the spout's 143 external screw threads 182 and the valve's 120 internal screw threads 186 are configured and arranged to releasably and rotatably engage each other, such that the valve 120 is releasably secured to the spout 143 and the interior 190 of the valve 120 is in fluid flow communication with the barrel 177 of the spout 143, when the valve 120 is in an opened position (described below).

The valve 120 includes a plastic tube 188 having an barrel 189 in fluid flow communication with the interior 176 of the batter container 130, and a silicon sleeve 190 that is generally self biased against the interior surface 191 of the barrel 189 of the plastic tube 188 wherein a relaxed and non open position (phantom lines in FIG. 5). A manual actuator 192 is pivotally received into the barrel 189 via the top portion 193 of the valve 120. The manual actuator 192 includes a handle 194 (e.g., a lever) and an interior portion 195. The interior portion 195 of the manual actuator 192 is attached to the silicone sleeve 190, such as by adhesive, welding or a fastener, such as but not limited to pins, rivets, screws, clamps and the like. Prior to manipulation by a user, the actuator 192 is in the substantially vertical and closed position, as denoted by the phantom lines. Accordingly, the interior portion 195 of the actuator 192 is also in a substantially vertical position and the silicone sleeve 190 is firmly biased against the interior surface 191 of the barrel 189 of the plastic tube 188, such that batter cannot pass out of the valve 120. In this configuration, the valve is in the closed position (e.g., non-dispense) and is not in fluid flow communication with the batter dispenser 130.

The handle 194 is positioned so as to be accessible to a user and movably by the user between dispense (open) and nondispense (closed) positions. For example, the user can push the handle 194 backwards or toward the batter container 130, as indicated by the single arrow in FIG. 5, toward the front pane 103, which simultaneously pivotally moves the inner portion 195 forward, as indicated by the double arrows in FIG. 5, which in turn pulls the portion of the silicone sleeve 190 attached to the interior portion 195 away from the interior surface 191 of the plastic barrel 189. Thus, the valve 120 is placed in an open position (e.g., dispense) by the user, such that the barrel 189 of the plastic tube 188 (e.g., the valve 120) is in fluid flow communication with the interior 176 of the batter container 130 (e.g., which is in the interior 114 of the housing 102). When the valve 120 is in the open (e.g., dispense) position, batter is dispensed into a container, such as a cup 127, placed under the valve 120 (on the drip tray cover 126).

Referring again to FIGS. 3-4, the floor 139 (e.g., bottom) of the batter container 130 generally slopes downward from the back wall 134 to the front wall 132. This configuration generally improves the movement (e.g., draining, flow) of batter from the back wall 134 toward the valve 120, such that substantially all of the batter is dispensed from the batter container 130. Accordingly, waste of batter is minimized.

As described above, the waffle and pancake batter dispenser 100 includes an ice pack assembly 115 that is configured and arranged to receive an ice pack 199 (e.g., a coolant pack). The ice pack assembly 115 includes a sloped ice pack bed 200 connected to front and a back supports 201, 202 and a finger 203 (e.g., prong, retaining member). The ice pack bed 200 and finger 203 are configured and arranged such that the finger 203 substantially prevents an ice pack 192 received on the ice pack bed 200 from slipping therefrom (e.g., off). For example, the finger 203 extends generally upward from the front support 201, such that an ice pack 199 placed on the ice pack bed 200 rests against the finger 203. Accordingly, an ice pack 199 is supported by the ice pack assembly 115.

The ice pack bed 200 is attached to front and back supports 201 and 202, which can be manufactured from a single piece of metal that is bent and molded into the desired configuration, or multiple panels that are attached (e.g., welded together). The front support 201 includes a front footing 204 that extends (e.g., curves) under the ice pack bed 200 and contacts a floor pan 206 (e.g., bottom panel) that supports the batter container 130. The floor pan 206 is located within the housing 102 such that the batter container 130 is lifted above the counter top on which the batter dispenser 100 is resting, such that a cup 127 can be placed beneath the valve 120 (e.g., the cup fits beneath the valve 120) and batter can be dispensed. The back support 202 includes a back footing 210 that also extends (e.g., curves) under the ice pack bed 194 and contacts the floor pan 206. Two adjustment pins 212 are connected to the back footing 210, such as via welding, and extend downward through two releasably mating adjustment slots 214 located in the floor pan 206. The adjustment slots 214 are oriented (e.g., extend) from front to back with respect to the front 104 of the batter dispenser's 100 housing 102. Accordingly, when the adjustment pins 212 are releasably and slidably engaged in the adjustment slots 214, the engaged adjustment pins 212 are forwardly and backwardly mobile with respect to a front of the housing 102, and the ice pack assembly 115 can be moved forward and backward, such that the position of the ice pack assembly 115 within the housing 102 is adjustable with respect to the housing 02 and the container 130, such that the ice pack 199 is snugged against the container bottom or floor 139 while being moveable to accommodate ice packs 199 of varying thickness.

In particular, the ice pack bed 200 generally slopes from back to front, such that the front end 220 of the ice pack bed 200 is lower than the back end 222 of the ice pack bed 200. An upwardly extending finger 203 is connected to the ice pack bed 200 adjacent to the front support 201. Accordingly, an ice pack 199 placed on (e.g., received by, supported by) the ice pack bed 200 also generally slopes from back to front, but the finger 203 prevents (e.g., blocks) the ice pack 199 received on the ice pack bed 200 from sliding off the front of the ice pack assembly 115. The slope (e.g., angle of incline) of the ice pack bed 200 is substantially equal to the slope (e.g., angle of incline) of the floor 139 of the batter container 130. When an ice pack 199 is placed on the ice pack bed 200, and a batter container 130 is placed in the housing 102, the position of the ice pack assembly 115 is adjusted (e.g., forward or backward by sliding the adjustment pins 212 within the adjustment slots 214), such that the ice pack 199 contacts as much of the exterior surface 226 of the batter container's 130 floor 139 as possible. Accordingly, batter within the batter container 130 is cooled by the ice pack 199 and the cool temperature of the batter is maintained over an extended period of time (e.g., until the ice pack 199 substantially becomes equivalent in temperature to the batter). For example, an ice pack 199 may maintain the cool temperature for about 2, 3, 4, 5, 6, 7, or 8-hours or longer.

Different types of ice packs 199 can be used with the batter dispenser 100 of the illustrated embodiment. For example, the user may select a rigid ice pack 199 (e.g., a rigid plastic container) filled with water or refrigerant gel, to cool the batter. Preferably, such a rigid ice pack 199 is sized and shaped such that it fits tightly against the exterior surface 226 of the floor 139, and optionally such that it (the rigid ice pack 199) contacts as much area of the exterior surface 226 of the floor 139 as possible. Alternatively, the user may select a non-rigid ice pack 199, such as a plastic bag filled with ice cubes or refrigerant gel. Non-rigid ice packs 199 tend to have irregular surfaces (e.g., a plurality of thicknesses). In order to firmly contact as much area of the exterior surface 226 of the floor 139 as possible, the location of the ice pack assembly 115 (e.g., with respect to the housing 102 or the floor pan 206) is adjusted by sliding the adjustment pins 212 backward and/or forward within the releasably engaged adjustment slots 214. Advantageously, locating the ice pack assembly 115 beneath the batter dispenser 130, as opposed to on the sides of the batter dispenser 130, enables the low profile housing 102 of the illustrated embodiment, such that less counter space is required by the device 100 than is required by devices that place coolant packs in the spaces between the sides of the batter container 130 and the housing 102. Furthermore, the ice pack 199 remains always in cooling contact with the container floor 139 and indirectly transferring heat from the batter in the bottom of the container 130 to the ice pack 199 until all the batter is used. When the ice pack or packs are placed on the sides above the floor 139, the batter eventually reaches a level that is below the ice and, therefore, not cooled in the prior art.

The batter container 130 is configured and arranged for quickly preparing various quantities of batter therein with a minimum amount of manual labor (e.g., measuring individual ingredients) and equipment (e.g., mixing tools, extra bowl or measuring devices). Referring now to FIG. 4, a plurality of water level lines 232, and optionally indicia 234, are located on an inner surface 236 of at least one of the batter container's 130 front, back or side walls 132, 134, 136 and 138. For example, in FIG. 4, the water level lines 232 and indicia 234 are located on the inner surface 236 of the front wall 132. Alternatively, or additionally, the water level lines 232 and optional indicia 234 can be located on the inner surfaces 236 of the side walls 136, 138, or on the back wall 134. Each water level line 232 (and optional indicia 234) is associated with an amount of water required to make (e.g., mix, prepare) a predetermined amount of batter within the batter container 130. For example, to make an amount of batter associated with one of the water level lines 232, a user measures (e.g., pours, dispenses) an amount of water required for that amount of batter into the batter container's 130 interior 176, such that the top of the water (e.g., the meniscus) generally aligns with the water level line 232 associated with that amount of batter. After the water has been measured into the batter container 130, the user adds the required amount of batter mix (e.g., a pre-made dry mix including the dry ingredients of the batter, such as flour, dried milk, leavening, shortening, salt, flavorings) into the batter container 130. Then the user mixes the batter mix and the water together (e.g., with a mixing utensil such as spoon, spatula or whisk) to make the completed batter. When the batter is complete, the user places the cover 140 on the batter container 130, places an ice pack 199 on the ice pack assembly 115, slides the closed batter container 130 into the housing 102, such that the ice pack 199 contacts the floor 139 of the batter container 130, and closes the front panel 103 of the housing 102. Batter can now be dispensed from the device 100, such as into a cup 127 placed on the drip tray cover 126.

After usage, the unused batter may be stored in the batter container 130 (e.g., in a refrigerator). Alternatively, the unused batter is poured from the batter container 130, and the batter container 130 is inverted and preferably placed in a dishwasher for cleaning, preferably a conventional dishwasher of the type for home use, so that the container 130 can essentially be used in any dishwasher. Prior to washing, the valve 120 is disconnected, and optionally disassembled, and also placed in the dishwasher for cleaning.

By way of example and not limitation, suppose the user wants to make 48 cups of batter. The user pours water into the interior 176 of the batter container 130, until the top of the water aligns with a 48-cup water level line 232 located on the front wall 132 interior surface 236. Next, the user adds the dry ingredients and mixes them into the water with a utensil, such as a whisk. The dry ingredients can be pre-measured and packaged (e.g., for each amount of batter to be mixed, associated with the water level line 232) such that the user simply has to open the appropriate package, and dump the entire contents of the package into the water. When the batter is mixed, the user places the cover 140 on the batter container 130, and the covered batter container 130 (with mixed batter therein) is ready to be placed into the housing 102.

The user opens the housing 102 by removing the front panel 103, such a by lifting the front panel such that the connection pins 116 and detents 117 are disengaged from the pin receptacles 119 and the lip 118 of the top panel 110, respectively. The user places an ice pack 199 on the ice pack assembly 115. Then the user places the batter dispenser 130 (e.g., containing the batter) into the housing 102, such that the floor 139 (e.g., bottom) of the batter container 130 firmly contacts the ice pack 199. For example, as the batter container 130 is placed into the housing 102, the back legs 150 of the container 130 slide around the ice pack assembly 115 and the floor 139 of the container 130 (e.g., the exterior surface 226) contacts the ice pack 199. As the container 130 slides into place, the floor 139 pushes the ice pack 199, which in turn presses on the ice pack assembly 115. Pressure on the ice pack assembly 115 pushes it backward, such that the adjustment pins slide in the adjustment slots 214 in the floor pan 206. The housing 102 is then closed, such as by replacing (e.g., re-engaging) the front panel 103.

It is to be understood that while certain forms of the present invention have been illustrated and described herein, it is not to be limited to the specific forms or arrangement of parts described and shown.

What is claimed and desired to be secured by Letters Patent is as follows:

1. In a waffle and pancake batter dispenser having a housing for receiving a batter container having an interior and a sloped floor, the improvement comprising:
    a) an ice pack assembly located in the housing;
    b) the ice pack assembly including a sloped ice pack bed and an adjustment pin, wherein the sloped ice back bed is configured and arranged for support of an ice pack at an angle of incline substantially equal to an angle of incline of the floor of the batter container, and wherein the adjustment pin is configured and arranged to releasably engage an adjustment slot located within the housing;
    c) wherein when an ice pack is placed on the ice pack bed and the batter container is received into the housing, the ice pack firmly contacts an exterior surface of the floor of the batter container, such that during use the ice pack cools the batter container.

2. The dispenser according to claim 1, wherein the housing is a low profile housing.

3. The dispenser according to claim 1, wherein the pin is a first pin and there is a second laterally spaced pin and the slot is a first slot and there is a second laterally spaced slot such that the pins mate with respective slots and wherein the adjustment slots include a front to rear orientation, such that engaged adjustment pins are forwardly and rearwardly mobile with respect to a front of the housing.

4. The dispenser according to claim 1, wherein the ice pack includes a plurality of thicknesses.

5. The dispenser according to claim 1, wherein the interior of the batter container includes a side inner surface and a plurality of water level lines located on the side inner surface, wherein the water level lines are associated with amounts of water required to make different pre-measured amounts of batter, such that a user can measure an amount of water into the dispenser interior, for making an associated pre-measured amount of batter within the dispenser interior.

6. The dispenser according to claim 1, wherein the batter dispenser comprises a non-drip valve.

7. The dispenser according to claim 6, wherein the non-drip valve comprises a plastic tube having a barrel in fluid flow communication with an interior of the batter container, and a silicon sleeve biases against the barrel of the plastic tube.

8. The dispenser according to claim 7, wherein the non-drip valve comprises an open position and a closed position, wherein when the valve is in the open position the barrel of the plastic tube is in fluid flow communication with the interior of the batter container, and when the valve is in the closed position the silicon sleeve is biased against the barrel of the plastic tube and the barrel of the plastic tube is not in fluid flow communication with the interior of the batter container.

9. A dispenser for preparing and dispensing waffle and pancake batter, comprising:
    a) a housing adapted to be placed on a surface, wherein the housing has an interior;
    b) an ice pack assembly slidably received within the housing interior, and comprising a sloped ice pack bed and at least two adjustment pins, wherein the sloped ice pack bed is configured and arranged to support an ice pack;
    c) a batter container removably received within the housing, and comprising a front wall, a back wall, two side walls, and a floor, all of which define an interior of the batter container, and a non-drip valve located at the bottom of the front wall, wherein the non-drip valve has an open position and a closed position and is generally biased in a closed position and wherein the floor slopes downwardly from the back wall to the front wall, such that the interior of the batter container is in fluid flow communication with an interior of the valve when the valve is in the open position.

10. The dispenser according to claim 9, wherein the housing comprises a floor pan having at least two adjustment slots for slidably receiving the at least two adjustment pins, such that during use, an ice pack supported by the ice pack bed is pressed against the bottom of the batter container, whereby batter located in the interior of the batter container is cooled.

11. The dispenser according to claim 9, wherein a slope of the ice pack bed is substantially equal to a slope of the floor of the batter container.

12. The dispenser according to claim 9, wherein the valve comprises a tube having a barrel, an orifice between the interior of the batter container and the barrel, a silicone sleeve biased against the barrel such that the orifice is closed, and a manual actuator for moving the valve from a closed position to an open position, wherein the barrel and the interior of the batter container are in fluid flow communication through the orifice when the valve is in the open position.

13. The dispenser of claim 9, wherein an interior surface of at least one of the front, back and side walls includes a plurality of water level lines, for indicating an amount of water to be added to the batter container, wherein the amount of water at each water level line is associated with a fixed amount of mixed batter.

14. The dispenser of claim 9, wherein the batter dispenser is sized to be received by a dish washing machine in an inverted orientation.

15. A batter dispenser comprising:
 a) an outer housing;
 b) a batter container sized and shaped to be slidingly received in the housing and having a lower sloped floor; and
 c) a cooling pack holder that is slidingly positioned beneath the batter container and that has an upper surface having a slope equivalent to the slope of the floor of the batter housing to receive a cooling pack thereon; the holder upper surface cooperating with the container floor so as to hold cooling packs of different thickness between the holder and the batter container floor because the holder is front to rear adjustable relative to the housing.

* * * * *